US012534956B2

(12) United States Patent
Eisenberg

(10) Patent No.: US 12,534,956 B2
(45) Date of Patent: Jan. 27, 2026

(54) WINDOW BLINDS WITH DECORATIVE VALANCE LIGHTING

(71) Applicant: Customode Designs, LLC, Wayne, NJ (US)

(72) Inventor: Matthew Eisenberg, Wayne, NJ (US)

(73) Assignee: Customode Designs, LLC, Little Falls, NJ (US)

( * ) Notice: Subject to any disclaimer, the term of this patent is extended or adjusted under 35 U.S.C. 154(b) by 572 days.

(21) Appl. No.: 17/853,843

(22) Filed: Jun. 29, 2022

(65) Prior Publication Data

US 2024/0003183 A1 Jan. 4, 2024

(51) Int. Cl.
*E06B 9/323* (2006.01)
*E06B 9/24* (2006.01)

(52) U.S. Cl.
CPC ........ *E06B 9/323* (2013.01); *E06B 2009/247* (2013.01)

(58) Field of Classification Search
CPC ...... E06B 2009/247; E06B 9/323; E06B 9/38; A47H 2/00; A47H 1/10; A47H 1/102; A47H 1/104
See application file for complete search history.

(56) References Cited

U.S. PATENT DOCUMENTS

| | | | | | |
|---|---|---|---|---|---|
| 1,786,787 | A * | 12/1930 | Steinmeyer | A47H 2/00 | 362/223 |
| 2,662,163 | A * | 12/1953 | Mollner | F21V 33/0016 | 362/151 |
| 2,708,711 | A * | 5/1955 | Mcginty | F21V 33/0016 | 248/265 |
| 4,254,813 | A * | 3/1981 | Vecchiarelli | A47H 2/00 | 160/19 |
| 5,012,850 | A * | 5/1991 | Schrader | E06B 9/323 | 160/902 |
| 5,272,608 | A * | 12/1993 | Engle | F21V 7/0016 | 362/240 |
| 5,713,657 | A * | 2/1998 | Dearborn | F21V 7/0016 | 362/147 |
| 5,893,628 | A * | 4/1999 | Byers | F21V 3/02 | 362/396 |
| 5,908,179 | A * | 6/1999 | Fimbres | F21V 19/009 | 362/151 |
| 5,944,084 | A * | 8/1999 | Cadorette | A47H 2/00 | 160/19 |
| D418,401 | S * | 1/2000 | Anderson | D8/395 | |
| D418,744 | S * | 1/2000 | Anderson | D8/395 | |

(Continued)

*Primary Examiner* — Abe Massad
*Assistant Examiner* — John W Hanes, Jr.
(74) *Attorney, Agent, or Firm* — Goldberg Cohen LLP

(57) ABSTRACT

A window blind assembly having a headrail supporting a plurality of slats depending therefrom and an aesthetic valance attached to the headrail for concealing the headrail further comprises a plurality of light mount assemblies attached to the headrail. Each light mount assembly has a support, a headrail clip attached to a first end of the support and engages the headrail, and a light clip attached to a second end of the support. An extrusion having a generally inverted U-shape defines a channel therein is engaged in the light clips and extends along and substantially parallel to the headrail. A strip light is retained in the channel, and a lens extends between ends of the legs of the inverted U-shaped extrusion.

21 Claims, 15 Drawing Sheets

(56) References Cited

U.S. PATENT DOCUMENTS

| | | | | |
|---|---|---|---|---|
| 6,388,404 | B1 * | 5/2002 | Schnebly | F21V 33/0016 318/16 |
| 6,532,625 | B1 * | 3/2003 | Stone | A47H 2/00 D25/119 |
| 6,672,359 | B2 * | 1/2004 | Morris | A47H 2/00 160/19 |
| 6,877,548 | B1 * | 4/2005 | Chartier | F21V 27/00 160/10 |
| 7,114,826 | B1 * | 10/2006 | Lilly | F21S 4/20 362/147 |
| 8,459,823 | B1 * | 6/2013 | Steele | F21V 33/006 362/244 |
| 8,684,566 | B2 * | 4/2014 | Bretschneider | F21V 7/28 362/217.08 |
| 9,541,245 | B2 * | 1/2017 | Floersch | A47F 5/0043 |
| 9,617,785 | B2 * | 4/2017 | Chou | E06B 9/50 |
| 9,874,324 | B2 * | 1/2018 | Attard | F21V 23/001 |
| 10,544,619 | B2 * | 1/2020 | Hall | B01J 23/30 |
| 10,808,455 | B2 * | 10/2020 | Hebeisen | G09F 15/0062 |
| 10,808,918 | B1 * | 10/2020 | Lahner | F21V 15/013 |
| 11,143,369 | B2 * | 10/2021 | Sapp | F21V 7/005 |
| 11,293,218 | B2 * | 4/2022 | Hebeisen | G09F 11/18 |
| 11,353,177 | B1 * | 6/2022 | Jia | F21V 33/0016 |
| 11,719,038 | B2 * | 8/2023 | Hebeisen | E06B 9/42 160/368.1 |
| 2003/0201072 | A1 * | 10/2003 | Bergeron | E06B 9/36 160/38 |
| 2004/0107613 | A1 * | 6/2004 | Park | G09F 11/29 40/515 |
| 2006/0070705 | A1 * | 4/2006 | Haffamier | A47H 1/022 160/38 |
| 2008/0230187 | A1 * | 9/2008 | Caron | A47H 2/00 160/10 |
| 2012/0320560 | A1 * | 12/2012 | Van Der Poel | E06B 9/32 362/1 |
| 2014/0318718 | A1 * | 10/2014 | Seehof | E06B 9/0638 160/127 |
| 2017/0114593 | A1 * | 4/2017 | Hebeisen | E06B 9/17007 |
| 2017/0208980 | A1 * | 7/2017 | Mullet | A47H 1/04 |
| 2017/0292285 | A1 * | 10/2017 | Jin | E04H 15/60 |
| 2019/0150650 | A1 * | 5/2019 | Mullet | A47H 2/00 |
| 2019/0271190 | A1 * | 9/2019 | Chou | E06B 9/266 |
| 2020/0131846 | A1 * | 4/2020 | Hebeisen | G09F 15/0062 |
| 2021/0054981 | A1 * | 2/2021 | Sapp | F21S 4/10 |
| 2022/0049546 | A1 * | 2/2022 | Daugaard | A47H 5/0325 |
| 2022/0053959 | A1 * | 2/2022 | Cooler | E06B 9/24 |
| 2024/0003183 | A1 * | 1/2024 | Eisenberg | E06B 9/323 |

* cited by examiner

WINDOW BLINDS WITH DECORATIVE VALANCE LIGHTING

FIELD OF THE INVENTION

This invention relates to window blinds that also incorporate an upper valance having an integral decorative lighting system.

BACKGROUND OF THE INVENTION

Window treatments have existed almost as long as windows were included in building structures. First, window treatments were most likely developed to insulate the interior of the building from the effects of the outdoor environment such as wind, rain, and snow. Early applications of window treatments were oiled animal skins thereby creating translucence to allow a degree of light to illuminate the room. Once the development of transparent glass was introduced into the industry to allow the full transmissibility of light, other window treatments were developed and added over the years.

Today, window treatments can take many forms to correspond to an occupant's practical and aesthetic tastes. Windows can include shutters, either interior or exterior, flexible shades of many types, cloth curtains of any color or design, or even blinds comprising a plurality of overlapping slats. The slats of the blinds can be oriented either vertically or horizontally and are typically supported by a rod or rigid support structure at the top of the window. In a desire to maintain pleasing aesthetics, the support rods or support structure are covered with a valance that is complementary to the curtains, shades, or blinds.

However, there is often a desire to further enhance the visual aspects of the window in addition to the window treatment. Often this enhancement is accomplished by placing lighting close to the window which illuminates the window area when the blinds are closed typically in the evenings when there is no available ambient natural light. In the past this lighting primarily comprised attempts to incorporate lighting into the blinds or one or more of incandescent lamps with shades, torchiere lamps, or other lighting devices separate from the curtains, shades, or blinds. Interior designers, lighting designers and end users always have an interest in new and novel lighting solutions, there is a desire to incorporate lighting in concert with the window treatment. Often, the heat of incandescent lamps or the coldness of fluorescent lights makes this application impractical or undesirable. Thus, a method of incorporating decorative lighting within the valance at the top area of the blinds is desired.

SUMMARY OF THE INVENTION

In accordance with the invention, a window blind assembly of the type having a headrail supporting a plurality of slats depending therefrom and an aesthetic valance attached to the headrail for concealing the headrail further comprises a plurality of light mount assemblies attached to the headrail. Each light mount assembly has a support, a headrail clip attached to a first end of the support and engages the headrail, and a light clip attached to a second end of the support. An extrusion having a generally inverted U-shape defines a channel therein is engaged in the light clips and extends along and substantially parallel to the headrail. A strip light is retained in the channel, and a lens extends between ends of the legs of the inverted U-shaped extrusion.

In a further aspect of the invention a controller is mounted to the headrail and electrically connected to the light strip.

In another aspect of the invention, the headrail clip is shaped as an inverted U, each leg of the U-shape defining a recess wherein the recesses engage oppositely extending flanges at the top of the headrail.

In an additional aspect of the invention, the light clip is shaped as an inverted U, each leg of the U-shape forming inwardly facing ridges, the ridges engaging recesses defined by the outer surface of the extrusion.

In another aspect of the invention, the strip light is a Light Emitting Diode strip light.

In yet a further aspect of the invention, the light mount assembly support includes a vertical leg at the second end thereof and further wherein a light clip is affixed to the vertical leg to horizontally orient the extrusion and direct the light strip toward the valance.

In yet another aspect of the invention, the valance defines a cutout area for the strip light to radiate light therethrough.

In a further aspect of the invention, the cutout area of the valance is covered by a lens.

In an additional aspect of the invention, the light mount assembly support includes a horizontal leg extending toward the valance at an end of the vertical leg, the horizontal leg having a second light clip affixed to a bottom surface thereof, a second elongated U-shaped extrusion is retained by the second light clips, and a second light strip is retained in the second elongated extrusion.

In yet another aspect of the invention, the light mount assembly support includes a horizontal leg extending toward the headrail at an end of the vertical leg, the horizontal leg having a second light clip affixed to a bottom surface thereof, a second elongated U-shaped extrusion is retained by the second light clips, and a second light strip retained in the second elongated extrusion.

In yet a further aspect of the invention, the valance is supported on the headrail with valance mounts engaged thereon, the blind assembly further includes a light clip affixed to an upper surface of the valance mount, a second elongate U-shaped extrusion defining a channel therealong and retained in the valance mount light clips wherein the U-shape is oriented upwards, and a second light strip retained within the U-shaped extrusion channel.

In an additional aspect of the invention, the extrusion channel is oriented at 45 degrees to the horizontal.

In yet another aspect of the invention, a lighting system for window blinds of the type having a headrail supporting a plurality of slats depending therefrom includes a plurality of light mount assemblies adapted to attach to the headrail, each light mount assembly has a support, a headrail clip attached to a first end of the support for engaging the headrail, and a light clip attached to a second end of the support. An extrusion having a generally inverted U-shape defines a channel therein and is engaged in the light clips and extending along and substantially parallel to the headrail. A strip light is retained in the channel, and a lens extends between ends of the legs of the inverted U-shaped extrusion.

In a further aspect of the invention, the headrail clip is shaped as an inverted U, and each leg of the U-shape defines a recess wherein the recesses are adapted to engage oppositely extending flanges at the top of the headrail.

In an additional aspect of the invention, the light clip is shaped as an inverted U, each leg of the U-shape forming inwardly facing ridges, the ridges engaging recesses defined by the outer surface of the extrusion.

In another aspect of the invention, the strip light is a Light Emitting Diode strip light.

In yet a further aspect of the invention, the light mount assembly support includes a vertical leg at the second end thereof and further wherein a light clip is affixed to the vertical leg to horizontally orient the extrusion for directing the light strip toward the valance.

In an additional aspect of the invention, the light mount assembly support includes a horizontal leg extending toward the valance at an end of the vertical leg, the horizontal leg having a second light clip affixed to a bottom surface thereof, a second elongated U-shaped extrusion is retained by the second light clips, and a second light strip is retained in the second elongated extrusion.

In yet another aspect of the invention, the light mount assembly support includes a horizontal leg extending toward the headrail at an end of the vertical leg, the horizontal leg having a second light clip affixed to a bottom surface thereof, a second elongated U-shaped extrusion is retained by the second light clips, and a second light strip retained in the second elongated extrusion.

In a further aspect of the invention, the lighting system further includes a controller for mounting to the headrail and is electrically connected to the light strip.

In an additional aspect of the invention, the extrusion channel is oriented at 45 degrees to the horizontal.

Further embodiments and features of the invention will become apparent in conjunction with the detailed description of the inventions and their preferred embodiments provided hereafter.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The embodiments described herein relates to the field of window treatments and more specifically to decorative lighting incorporated with indoor blinds. The indoor blinds include a valance for decoratively concealing the headrail from which the blinds depend, and a light emitting diode (LED) light strip substantially extending parallel to the headrail and behind the valance.

Figure 1:
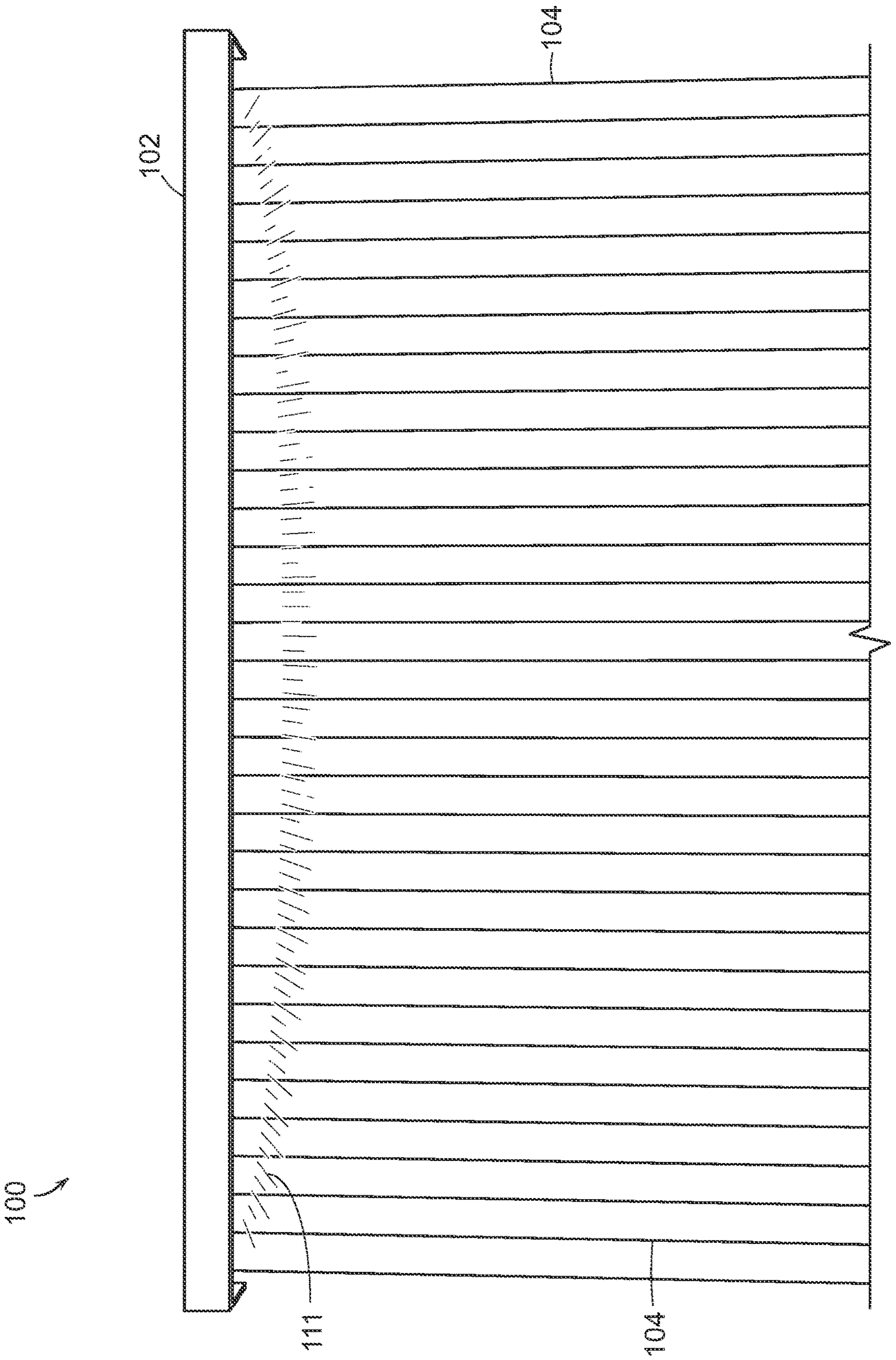
FIG. 1 presents a window blind installation with a valance having illuminated background lighting.
Figure 2:
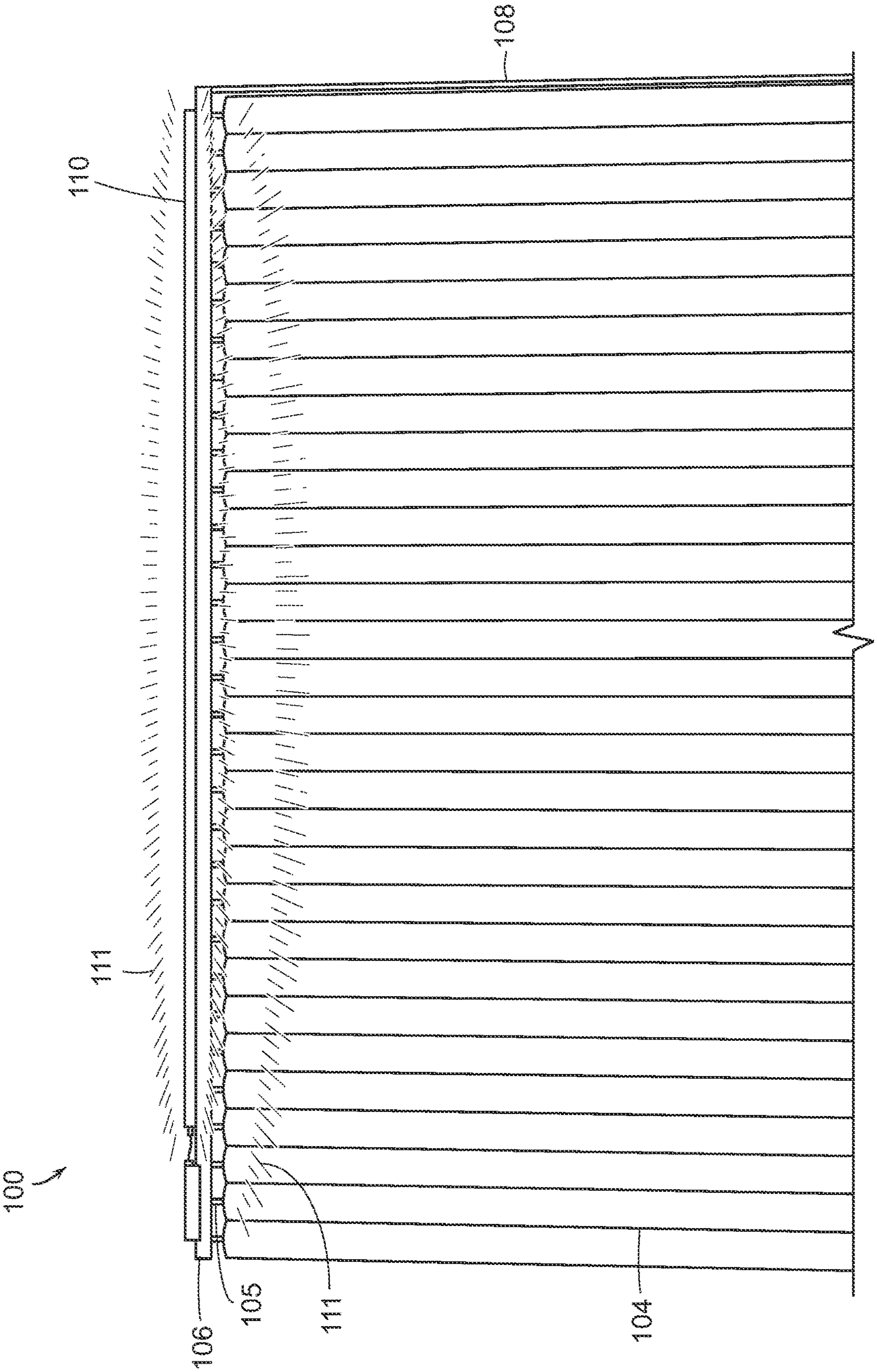
FIG. 2 presents the window blind installation wherein the front decorative panel is removed.

In one exemplary implementation of the invention, a blind assembly 100 including a backlit valance is shown in FIG. 1 wherein downward oriented backlighting 111 radiates from behind the valance 102. FIGS. 1-10 illustrate its various components.

A vertical blind assembly 100 includes a headrail 106 which is mounted to a wall utilizing a plurality of mount brackets 103. Headrail 106 has suspended therefrom a plurality of laterally arranged vertical slats 104. Headrail 106 further contains therein a mechanism known in the art for laterally translating the vertical slats 104 along headrail 106 and for rotating the individual slats 104 about a central axis defined by suspension rods 105. Manual control of these functions is accomplished by one or both of a control rod 108 and a control cord (not shown). A valance 102 is mounted to the headrail 106 to aesthetically conceal the headrail 106 and operating mechanism.

A light system 110 is mounted to the headrail 106. In a most preferred embodiment, the light system 110 comprises a plurality of mount assemblies 130 and a light emitting diode (LED) strip light 120 having a plurality of LED lights arranged as a rope or similar light string in a configuration known in the industry. Other lighting configurations are contemplated but not illustrated herein, and references to an LED strip light are not to be construed as limiting but are intended to be inclusive of other light string configurations.

Figure 3:
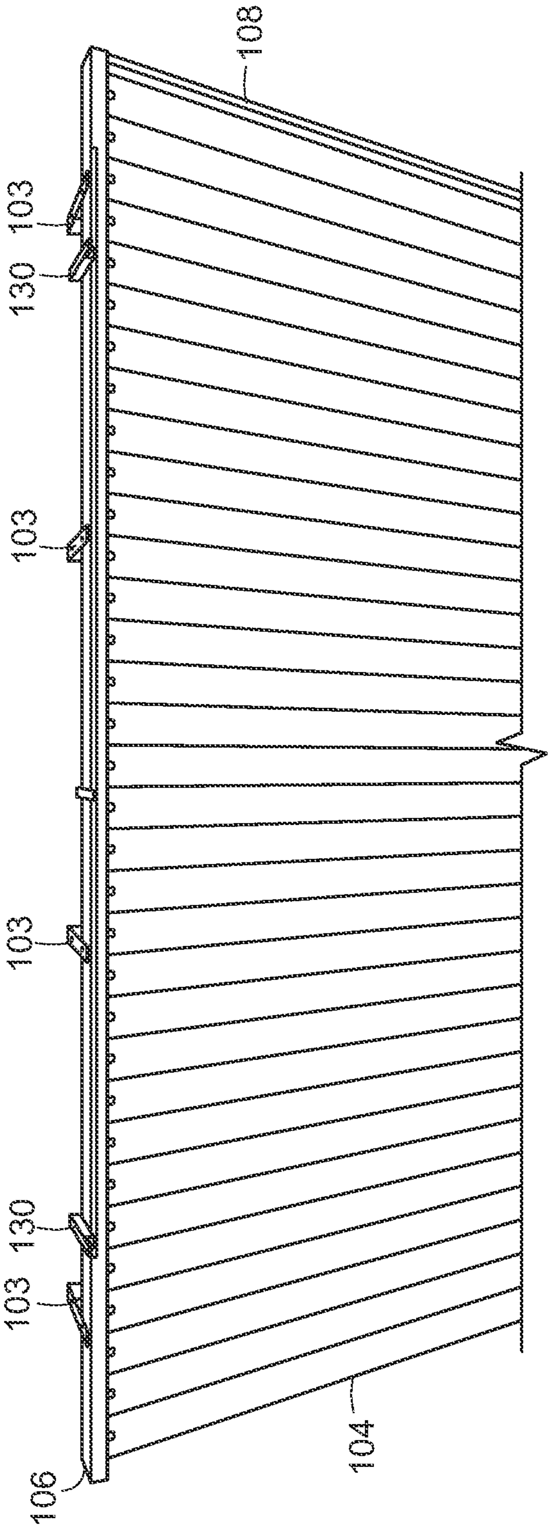
FIG. 3 presents a top front isometric view of the window illustrating the supporting headrail assembly.

As shown in FIG. 3, with the valance 102 removed, the headrail 106 is supported above a floor level with a plurality of headrail mount brackets 103. The number of headrail mount brackets 103 utilized in an installation is dependent upon the total length of the headrail 106. The headrail 106 is mounted above the floor level at a distance is such that vertical slats 104 hang freely a short distance above the floor. However, the lower portion of the slats 104 have been truncated for the sake of clarity of FIG. 3. At least two light mount assemblies 130 are attached to the headrail 106 for mounting the light system 110 to the blind assembly 100.

Figure 4:
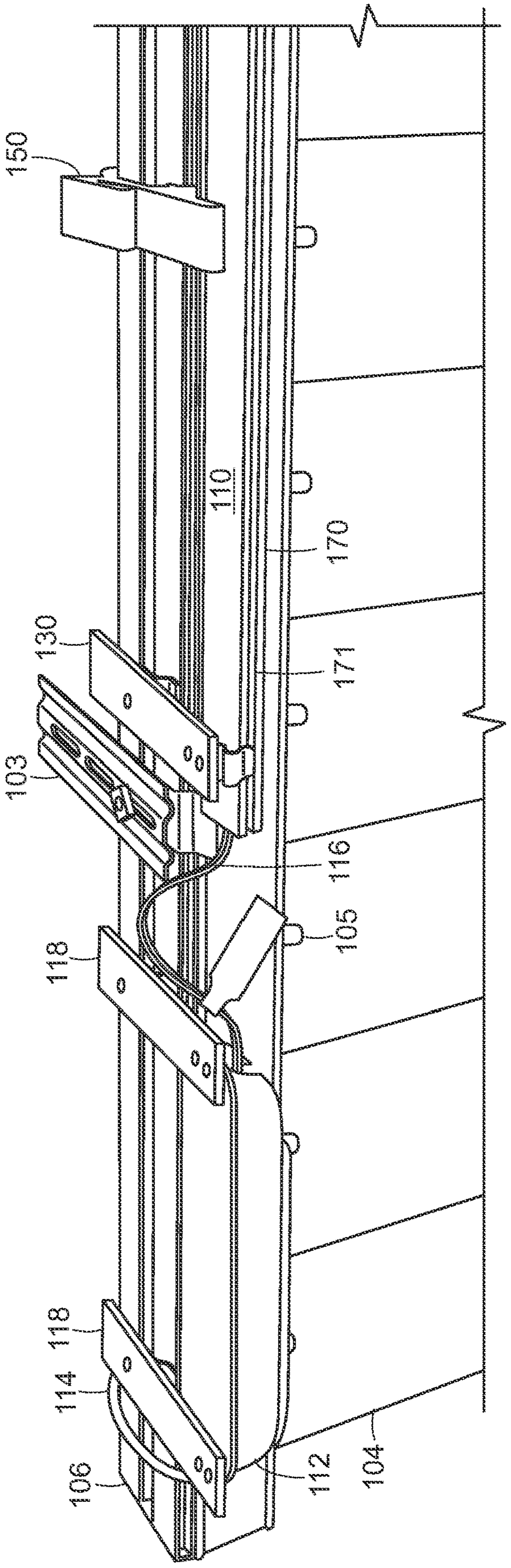
FIG. 4 presents an enlarged isometric view of the left hand portion of the headrail assembly.
Figure 5:
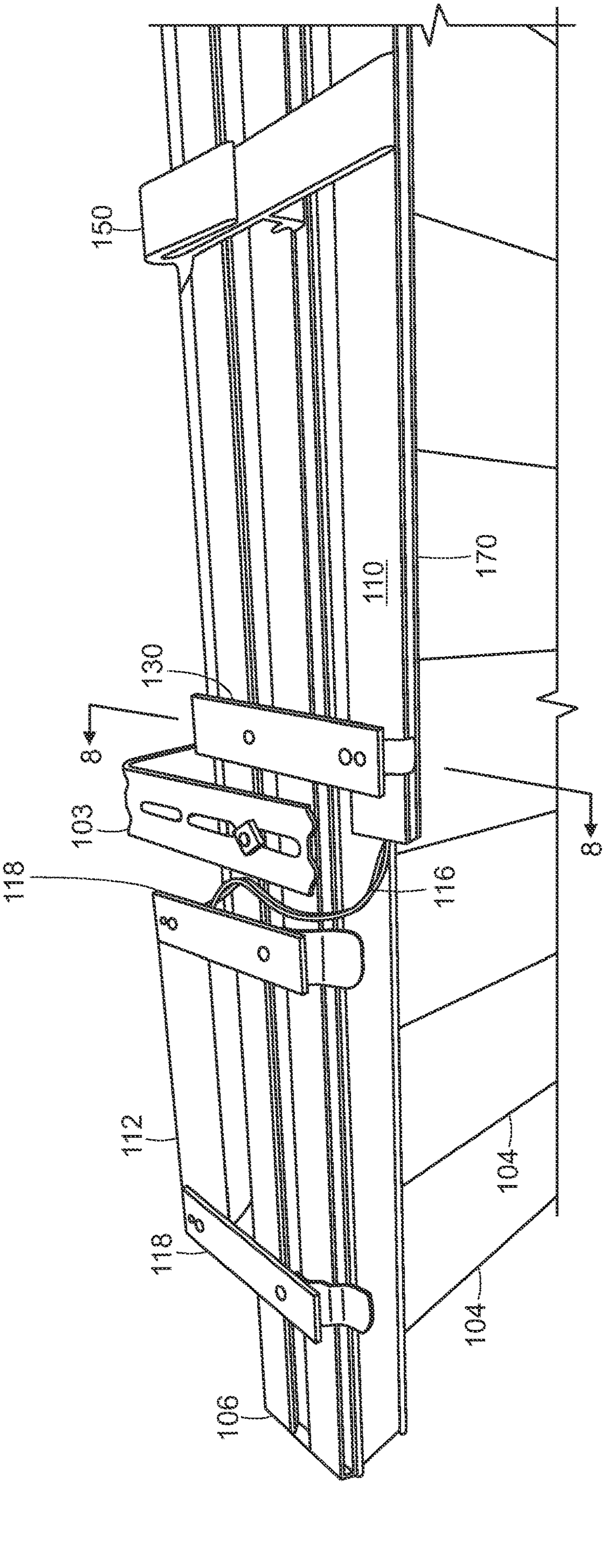
FIG. 5 presents enlarged isometric view of an alternate configuration of the left hand portion of the headrail assembly.

Turning now to FIGS. 4-5, an enlarged partial view of the blind assembly 100 is illustrated showing the mounting of the light assembly 110 to the headrail 106 of the blind assembly 100. The light assembly 110 generally comprises an elongate extrusion 170 defining a channel 172 (FIG. 8) therealong which, in turn, receives the LED light strip 120. The elongate extrusion 170 is retained by the plurality of light mount assemblies 130 which are removably affixed to the headrail 106 in a manner further described below. A plurality of valance mounts 150 also engage headrail 106 for retaining and supporting the valance 102. A light controller 112 is also retained by two controller brackets 118 which are also removably affixed to the headrail 106 in a similar manner. In a first configuration the controller 112 is positioned on the front side of the headrail 106 and at one end thereof but concealed by the valance 102 (not shown). Alternatively, the controller 112 can be positioned at the rear side of the headrail 106 at one end thereof such that the controller 112 is positioned between the headrail 106 and the supporting wall.

Figure 8:
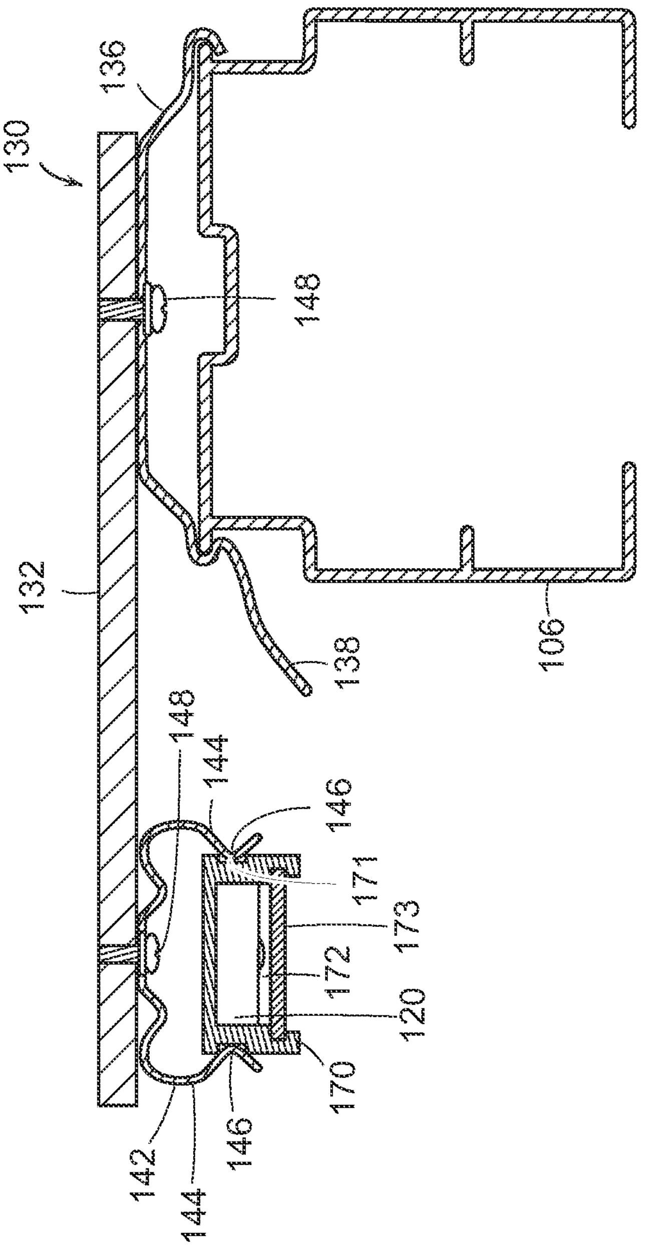
FIG. 8 presents a cross-sectional view of the light bracket affixed to the headrail and supporting an LED strip light taken along the line 8-8 of FIG. 5.

The controller 112 is powered by low voltage electric current utilizing a transformer plugged into a standard wall outlet with a power cord 114 extending therebetween in a manner known in the art and not further shown herein. A control cable 116 extends between the controller 112 and the LED light strip 120 (FIG. 8). The control cable 116 conducts control signals from the controller 112 to the LED light strip 120 for the purpose of powering the LEDs, controlling the intensity of the emitted light, the desired light color, and the light mode (steady, flashing, pulsing, traveling, etc.). The controller 112 receives wireless signals broadcast by a handheld remote control (not shown), the configuration and function of which is well known in the art and not further described herein.

Figure 6:
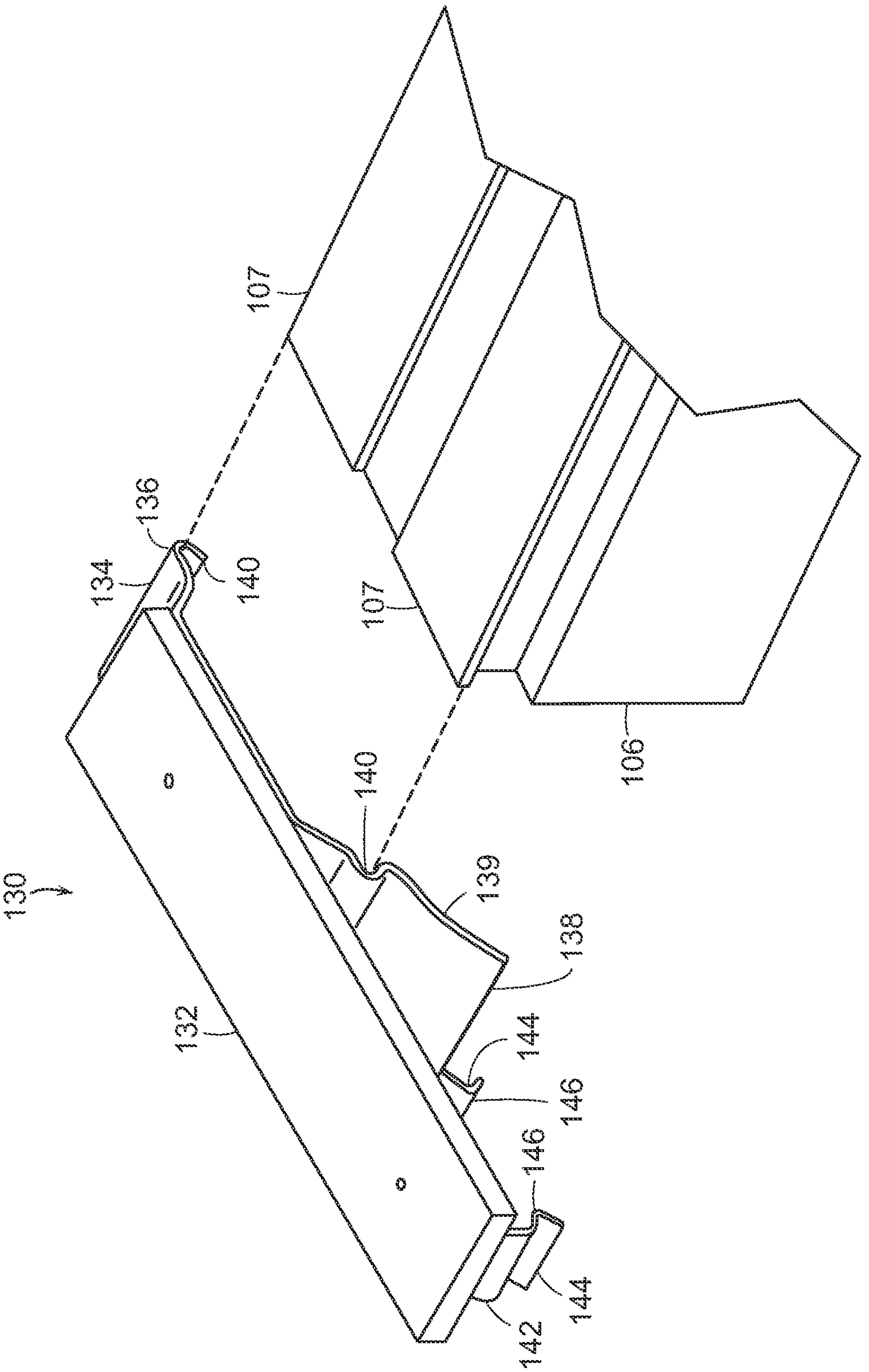
FIG. 6 presents an isometric view of the light bracket for attaching an LED strip light to the headrail assembly.
Figure 7:
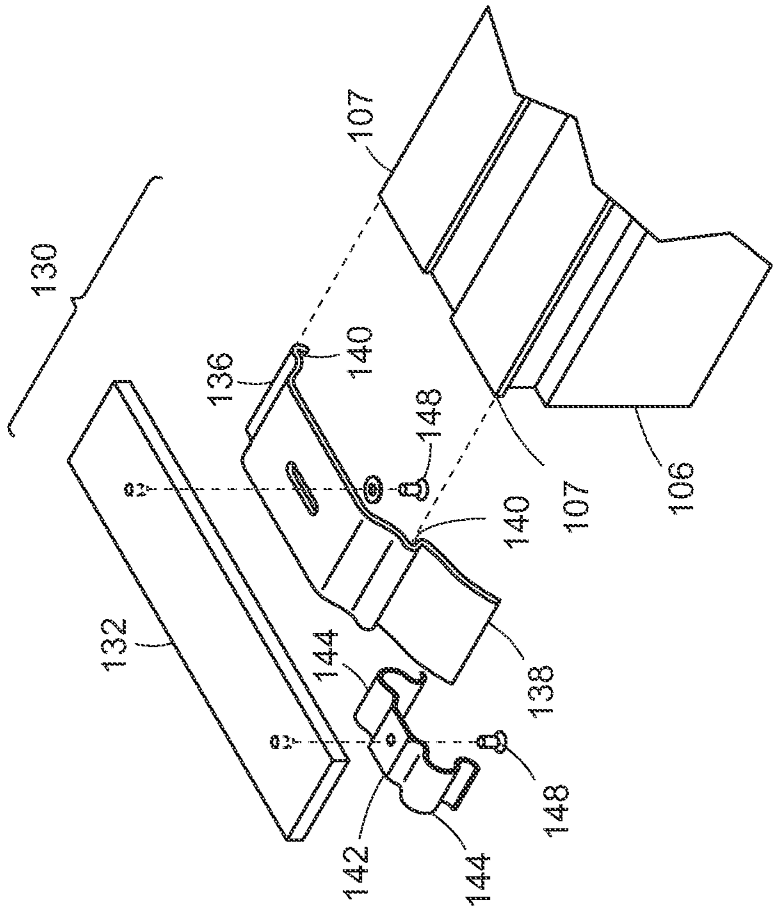
FIG. 7 presents an isometric exploded view of the bracket of FIG. 6.

FIGS. 6-8 illustrate the configuration of the light mount assembly 130. Light mount assembly 130 comprises a support 132, here configured as an elongate plate to which and proximate to one end thereof and on an underside thereof is affixed a headrail clip 134 utilizing a screw 148. Headrail clip 134 includes two semi-resilient legs, a first leg 136 and a second leg 138. Each of the legs 136, 138 include opposing recesses 140. Recesses 140 engage outer flanges 107 of the headrail 106 thereby securing the light mount assembly 130 to the headrail 106 at substantially a right angle thereof. Second leg 138 extends beyond recess 140 to form a finger release 139. Finger release 139 functions to give a user leverage to disengage leg 138 from the flange 107 of the headrail 106. Support 132 extends forward from the headrail 106 in a cantilevered fashion.

At an end of support 132 opposite from the headrail clip 134 a light clip 142 is fastened to an underside thereof with a screw 148. The light clip 142 includes two opposing semi-resilient legs 144. The legs 144 are formed to include opposing ridges 146. The light clip 142 receives an elongated extrusion 170 wherein the opposing ridges 146 engage recesses 171 at each side of the extrusion 170 (FIG. 8).

The elongated extrusion 170 is formed in the general shape of an inverted U thereby defining a downward facing channel 172. The downward facing channel 172 receives the LED light strip 120 wherein the LED light strip 120 is further retained in the channel 172 typically by a double sided tape (not shown) adhesively affixed between the light strip 120 and the extrusion 170. A lens 173 extends across the opening of the inverted U channel 172. The lens 173 can be transparent, translucent, or colored and can also be faceted to provide a variety of lighting effects.

In use, the valance 102 is disengaged from the valance mounts 150. A plurality of light mount assemblies 130 are installed on the headrail 106 by engaging the flanges 107 of the headrail 106 in the respective recesses 140 of the headrail clip 134. The light strip 120 of LED light assembly 110 is inserted into the U-shaped channel 172 of extrusion 170 and a lens 173 is engaged over the opening to the U-shaped channel 172. The extrusion 170 is then inserted in the light clips 142 by engaging the ridges 146 of the light clip 142 in the side recesses 171 of the extrusion 170 such that the light from the LED light strip is directed downward. The controller 112 is affixed to the controller brackets 118 which are then engaged on the headrail 106 in the same manner as the light mount assemblies 130. The low voltage supply (not shown) is plugged into a wall outlet in the LED light assembly 110 is activated using the known remote control. The various inputs to the remote control directed the color of light radiating from the LED lights and also of the mode of the lights such as steady, pulsing, traveling, flashing, etc.

Figure 9:
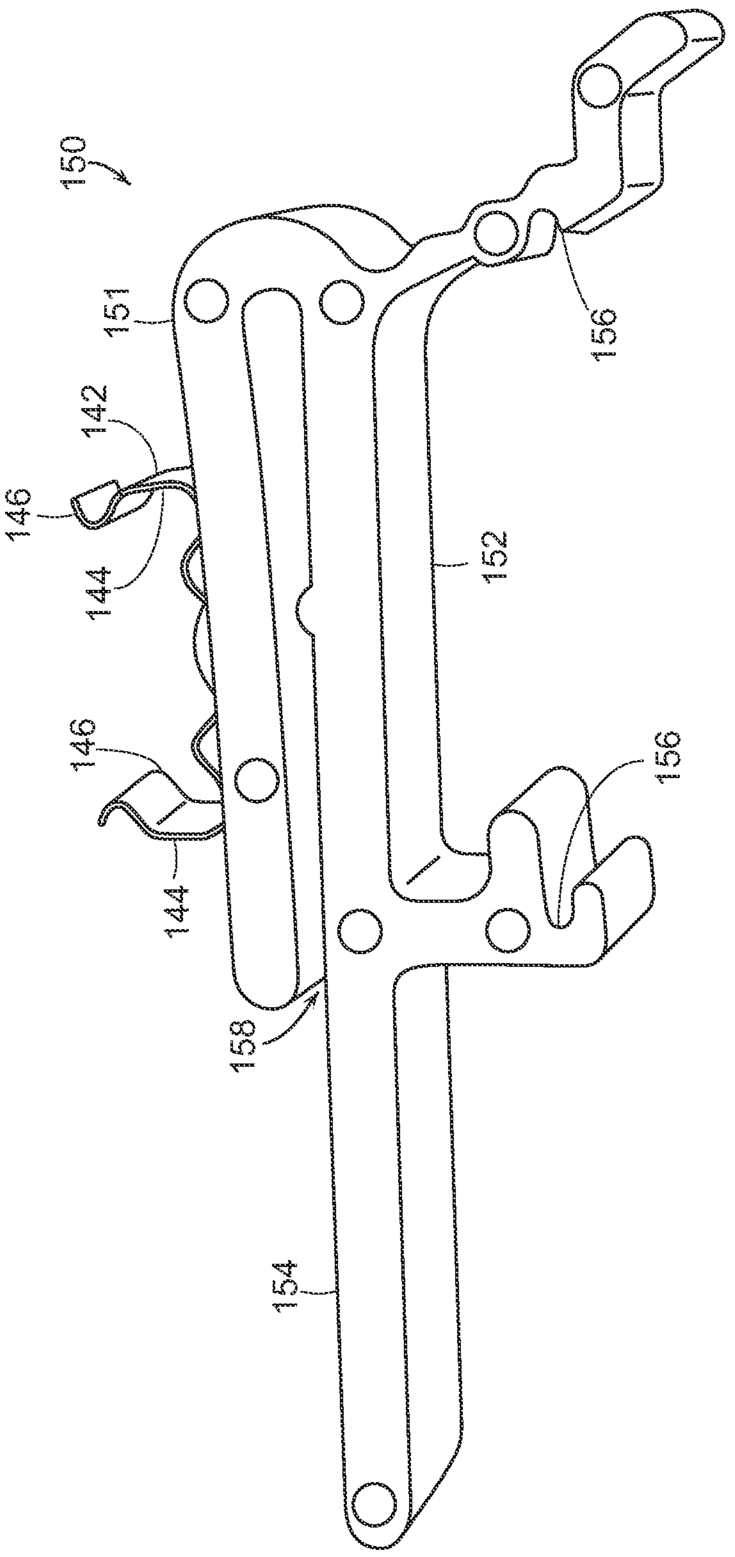
FIG. 9 presents an isometric view of a modified valance bracket.

The lighting effect can be enhanced by the addition of one or more light strips 120 connected to the controller 112. In an additional embodiment as illustrated in FIG. 9, the valance mount 150 can be modified by affixing an upward facing light clip 142 to the upper surface of the top leg 151 of the valance mount 150. The valance mount 150 engages the headrail 106 by receiving the flanges 107 in the recesses 156 extending from the body 152 of the valance mount 150. Although not shown, a second elongated extrusion 170 having an LED light assembly 110 retained in the U-shaped channel 172 formed by the extrusion 170 is then inserted into the light clips 142 affixed to the various valance mounts 150.

Figure 10:
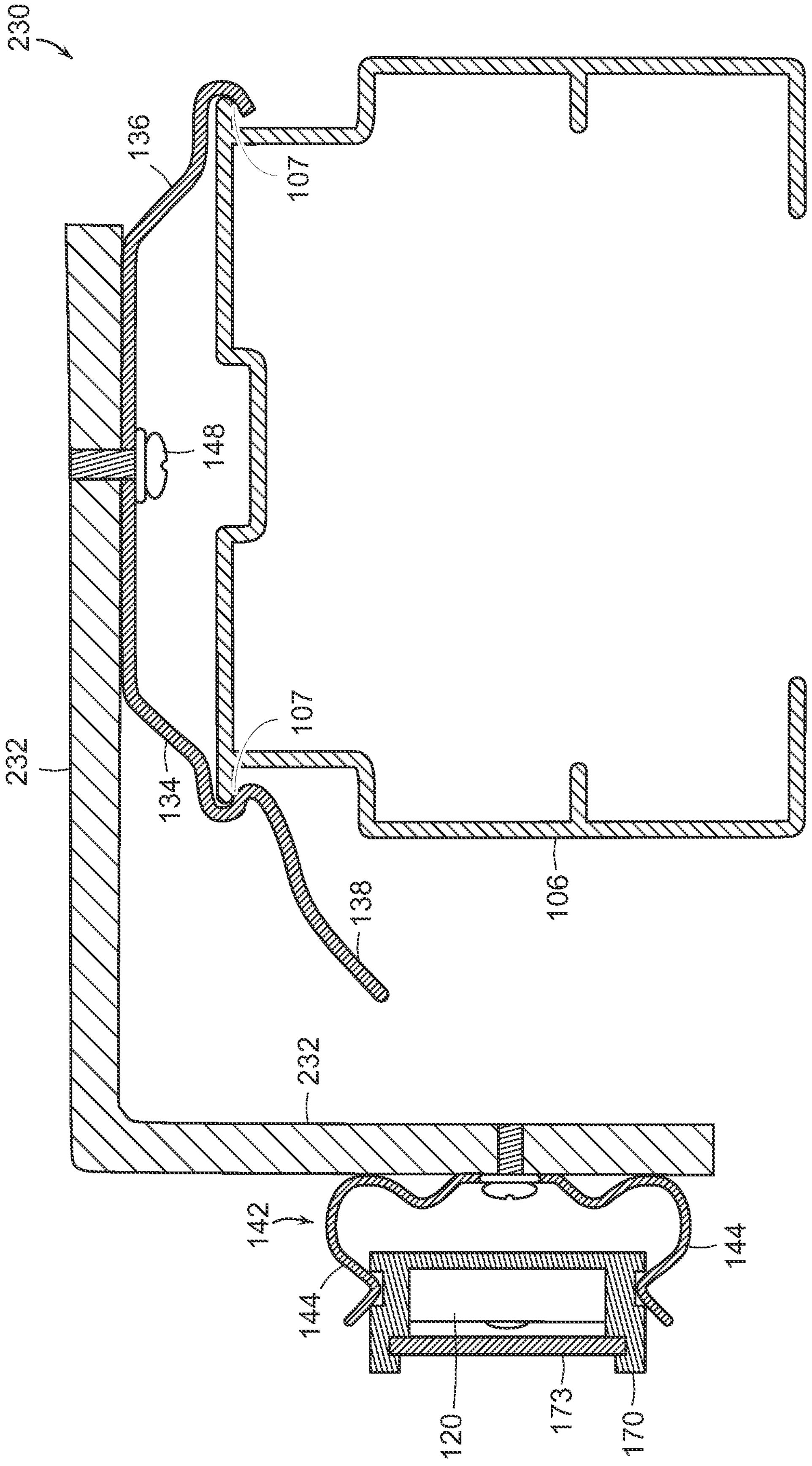
FIG. 10 presents a cross-sectional view of an alternate configuration light bracket for a forward projecting LED light strip.

Referring now to FIG. 10, an alternate configuration light mount assembly 230 is illustrated wherein the support 232 includes a headrail clip 134 having semi-resilient legs 136, 138 for engaging flanges 107 of headrail 106 as previously described. The support 232 further includes a downwardly extending leg 233 at the cantilevered end opposite from the headrail clip 134. A light clip 142 is affixed to the vertical leg 233 such that an elongated extrusion 170 inclusive with the LED light strip 120 is engaged therewith wherein the U-shaped channel 172 and the LED light strip 120 are oriented to radiate light horizontally away from the headrail 106. The valance 102 utilized in conjunction with light mount assemblies 230 can have a transparent or translucent panel to permit the light generated by the LED light strip 122 radiate through the valance 102 and into the room. Alternately, the valance 102 can define a cutout area (not shown) corresponding to the extrusion 170 to permit the light from the LED light strip 120 to radiate directly into the room.

Figure 11:
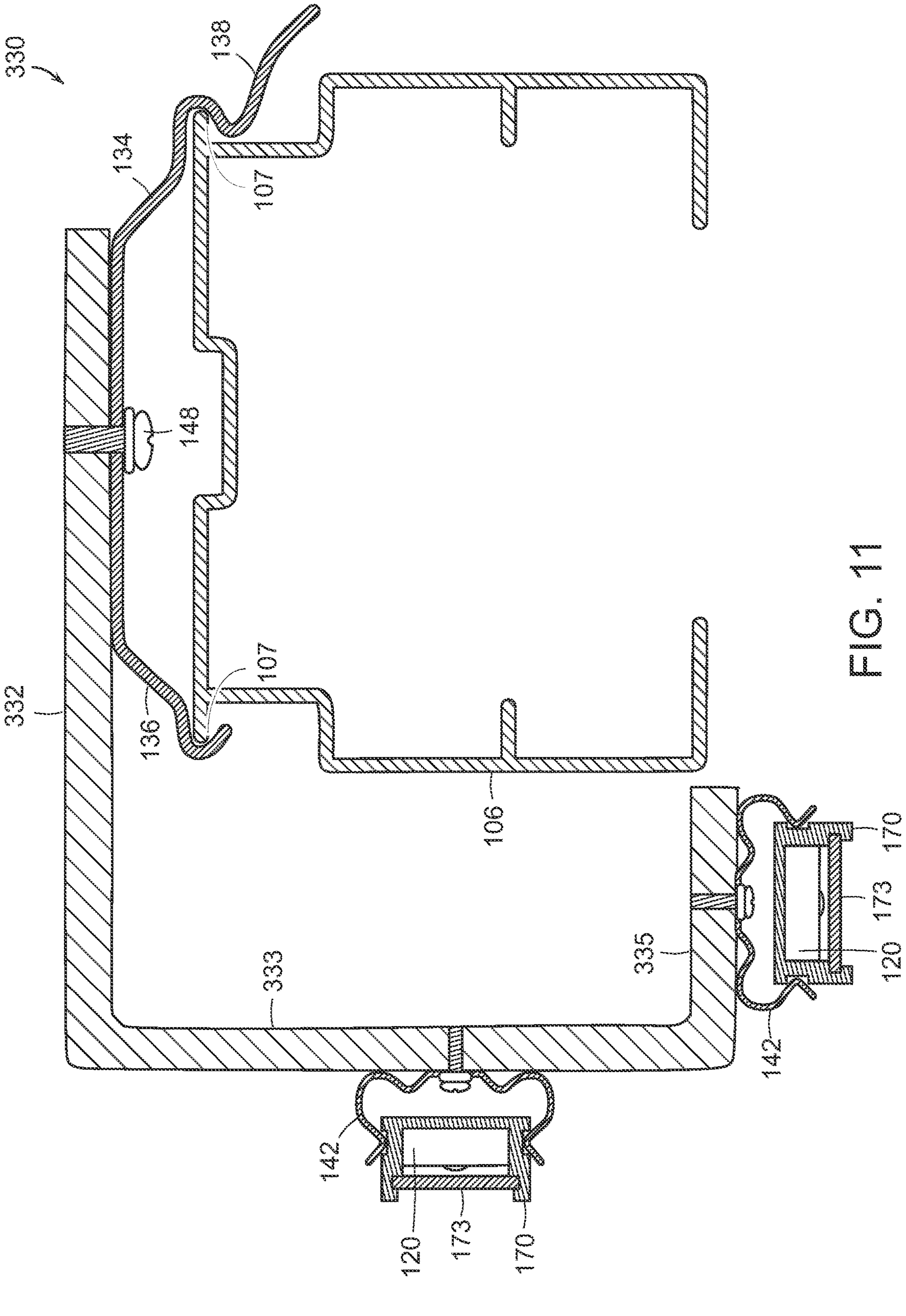
FIG. 11 presents a cross-sectional view of an alternate configuration light bracket for a combination forward and downward projecting LED light strip.
Figure 12:
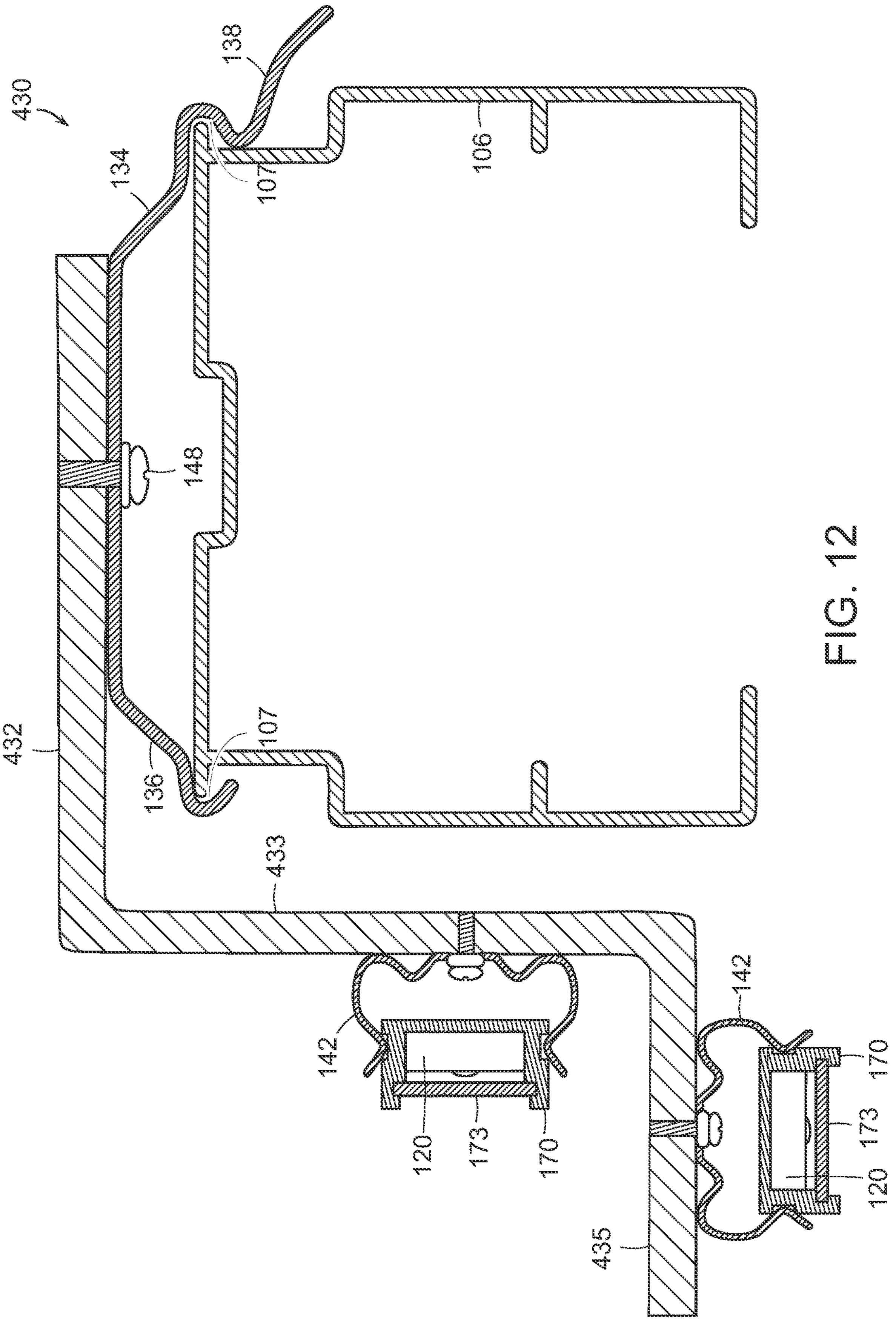
FIG. 12 presents a cross-sectional view of an alternate configuration light bracket for a combination forward and downward projecting LED light strip.

Further embodiments of the light mount assembly are illustrated in FIGS. 11-12 incorporating provisions for the inclusion of both a forward oriented LED light strip and a downward oriented LED light strip. As shown in FIG. 11, the light mount assembly 330 comprises a support 332 having a headrail clip 134 affixed to an underside thereof. The headrail clip 134 is oriented 180° opposite from previous embodiments such that the release leg 138 is positioned at the rear of the mount assembly 330. The support 332 includes a vertical leg 333 extending downward from the forward cantilevered end of the support 332 opposite from headrail clip 134. The vertical leg 333 has a light clip 142 affixed thereto to accommodate receipt and retention of an LED light strip 120 and extrusion 170 oriented to project horizontally into the room. Additionally, a horizontal leg 335 extends rearwardly from a bottom of the vertical leg 333 and has a light clip 142 affixed thereto to accommodate receipt and retention of an LED light strip 120 and extrusion 170 oriented to project downwardly.

As shown in FIG. 12, a similar embodiment for inclusion of a forward oriented LED light strip and a downward oriented LED light strip is shown. The light mount assembly 430 comprises a support 432 having a headrail clip 134 affixed to an underside thereof. The headrail clip 134 is also oriented 180° opposite from previous embodiments such that the release leg 138 is positioned at the rear of the mount assembly 430. The support 432 includes a vertical leg 433 extending downward from the forward cantilevered end of the support 432 opposite from the headrail clip 134. The vertical leg 433 has a light clip 142 affixed thereto to accommodate receipt and retention of an LED light strip 120 and extrusion 170 oriented to project horizontally into the room. Additionally, a horizontal leg 435 extends forwardly from a bottom of the vertical leg 433 and has a light clip 142 affixed to a bottom surface thereof to accommodate receipt and retention of an LED light strip 120 and extrusion 170 oriented to project downwardly.

Figure 13:
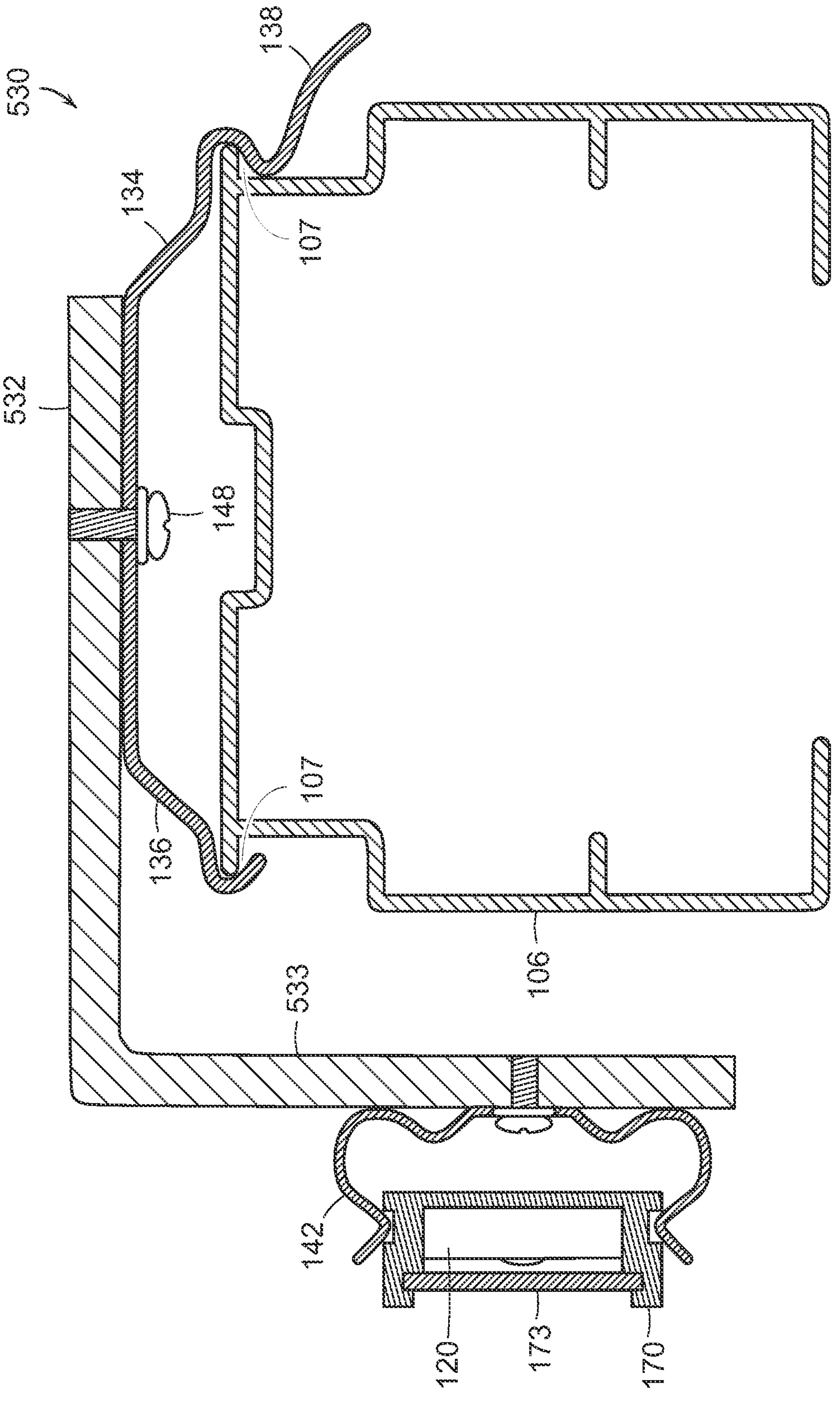
FIG. 13 presents a cross-sectional view of an alternate configuration light bracket for a forward projecting LED light strip with maximum setback.

Referring now to FIG. 13, light mount assembly 530 comprises a support 532 having a headrail clip 134 affixed to an underside thereof. The headrail clip 134 is also oriented 180° opposite from previous embodiments such that release leg 138 is positioned at a rear of the mount assembly 530. The support 532 includes a vertical leg 533 extending downward from the forward cantilevered end of the support 532. The support 532 is foreshortened such that the vertical leg 533 is positioned close to headrail 106. The vertical leg 533 has a light clip 142 affixed thereto to accommodate receipt and retention of the LED light strip 120 and extrusion 170 which are oriented to project horizontally into the room.

Figure 14:
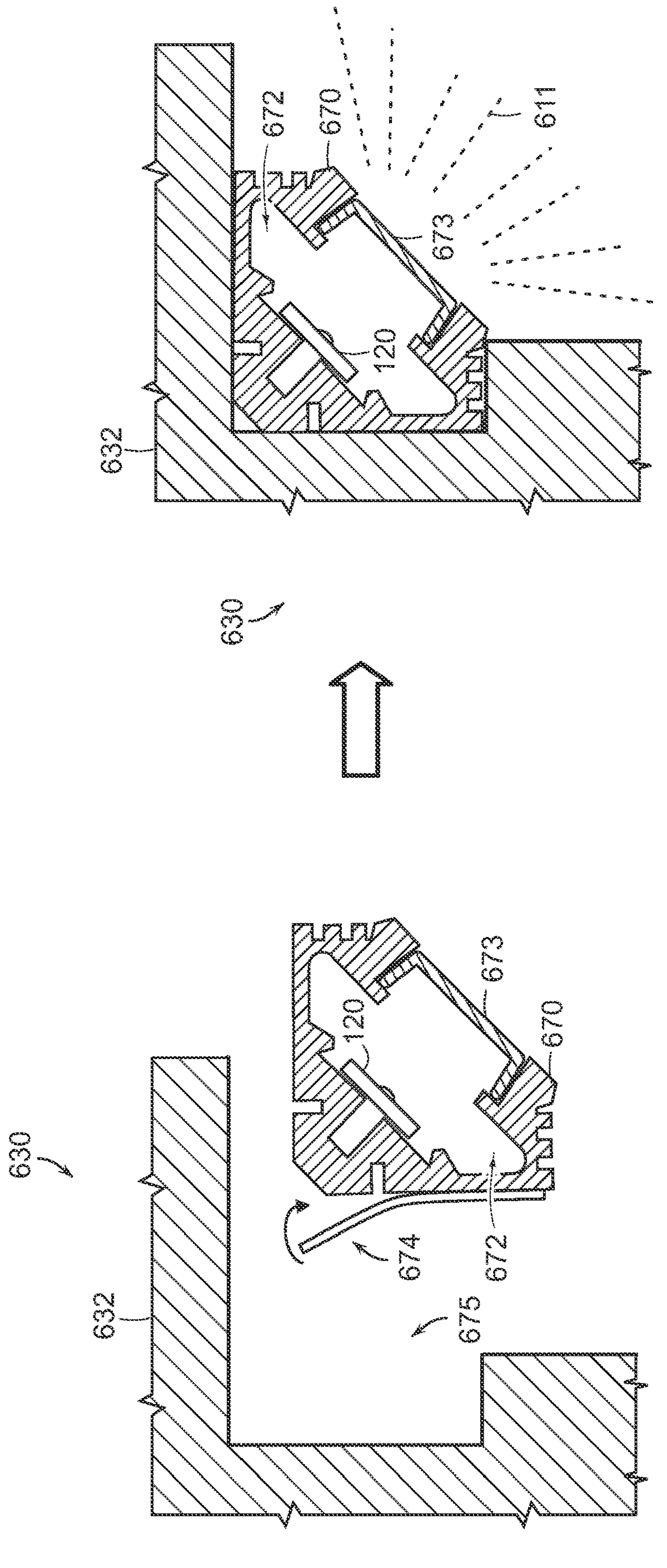
FIG. 14 presents a cross-sectional view of a first mode of attaching a 45 degree extrusion and LED strip light to a light bracket.
Figure 15:
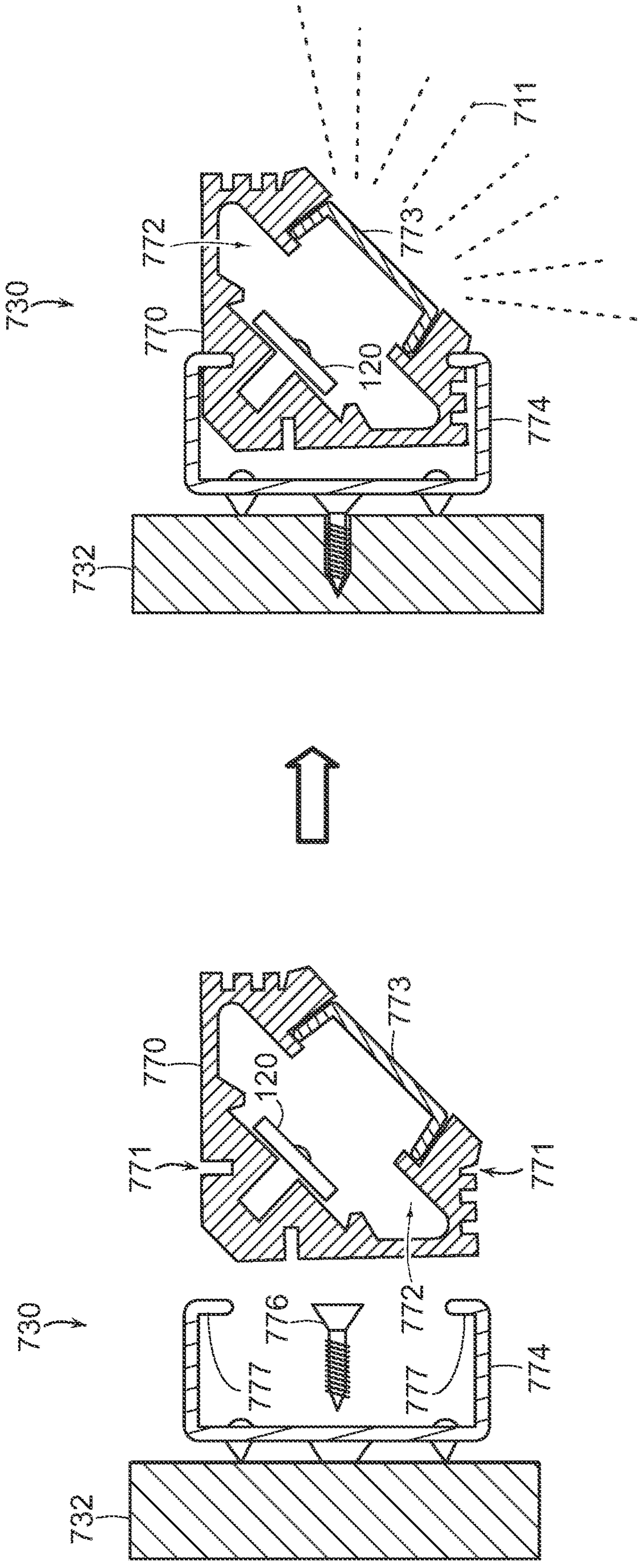
FIG. 15 presents a cross-sectional view of a second mode of attaching a 45 degree extrusion and LED strip light to a light bracket.

Additionally, the LED light strip 120 may be desired to be oriented at a 45° angle with respect to the horizontal. This can be accomplished as illustrated in FIG. 14 and FIG. 15. As shown in FIG. 14, a light mount assembly 630 can include a support 632 which defines a recess 675 sized to closely accommodate an extrusion 670. Extrusion 670 defines an inner channel 672 oriented at 45° which receives the LED light strip 120 therein. A lens 673 covers the channel 672 and can be colored, translucent, transparent, etc. A retainer 674 binds the extrusion 670 into the recess 675 of the support 632. When the LED light strip is energized radiated light 611 emanates through the lens 673 in the desired 45° orientation.

Alternatively, as shown in FIG. 15, a light support assembly 730 having a support 732 includes a like configured extrusion 770 defining a 45° oriented internal channel 772 which, in turn, is covered by a lens 773. The extrusion 770 also defines external recesses 771 extending along a length thereof at opposing sides of the extrusion 770. The light support assembly 730 has a C-shaped retainer 774 fastened to the support 732 of the light mount assembly 730. The C-shaped retainer 774 includes opposing flanges 777 which are spaced to engage recesses 771 of the extrusion 770 and thus retain the extrusion 770 in a desired orientation with respect to the light support assembly 730. When energized, the LED light strip 120 then radiates light therefrom at the desired 45° orientation with respect to the horizontal.

Since many modifications, variations, and changes in detail can be made to the afore described preferred embodiments of the invention, the intention herein is that all matters in the foregoing description and shown in the accompanying drawings be interpreted as illustrative and not in a limiting sense. Thus, the scope of the invention should be determined by the appended claims and their legal equivalents.

I claim:

1. A window blind assembly having a headrail supporting a plurality of slats depending therefrom and an aesthetic valance attached to the headrail for concealing the headrail, the window blind assembly further including:

a plurality of light mount assemblies removably attached to the headrail, each removable light mount assembly having a support, a headrail clip attached to a first longitudinal end of the support and engaging the headrail, and a light clip attached to a second opposite longitudinal end of the support;

an extrusion having a generally inverted U-shape defining a channel therein, the extrusion engaged in the light clips and extending along and substantially parallel to the headrail;

a strip light retained in the channel; and a lens extending between ends of the legs of the inverted U-shaped extrusion.

2. The window blind assembly according to claim 1 further comprising a controller mounted to the headrail and electrically connected to the light strip.

3. The window blind assembly according to claim 1 wherein the headrail clip is shaped as an inverted U, each leg of the U-shape defining a recess wherein the recesses engage oppositely extending flanges at the top of the headrail.

4. The window blind assembly according to claim 1 wherein the light clip is shaped as an inverted U, each leg of the U-shape forming inwardly facing ridges, the ridges engaging recesses defined by the outer surface of the extrusion.

5. The window blind assembly according to claim 1 wherein the strip light is a Light Emitting Diode strip light.

6. The window blind assembly according to claim 1 wherein the light mount assembly support includes a vertical leg at the second end thereof and further wherein a light clip is affixed to the vertical leg to horizontally orient the extrusion and direct the light strip toward the valance.

7. The window blind assembly according to claim 6 wherein the valance defines a cutout area for the strip light to radiate light therethrough.

8. The window blind assembly according to claim 7 wherein the cutout area of the valance is covered by a lens.

9. The window blind assembly according to claim 6 wherein:

the light mount assembly support includes a horizontal leg extending toward the valance at an end of the vertical leg, the horizontal leg having a second light clip affixed to a bottom surface thereof;

a second elongated U-shaped extrusion retained by the second light clips; and a second light strip retained in the second elongated extrusion.

10. The window blind assembly according to claim 6 wherein:

the light mount assembly support includes a horizontal leg extending toward the headrail at an end of the vertical leg, the horizontal leg having a second light clip affixed to a bottom surface thereof;

a second elongated U-shaped extrusion retained by the second light clips; and a second light strip retained in the second elongated extrusion.

11. The window blind assembly according to claim 1 wherein the valance is supported on the headrail with valance mounts engaged thereon, the blind assembly further including:

a second light strip.

12. The window blind assembly according to claim 1 wherein the extrusion channel is oriented at 45 degrees to the horizontal.

13. A lighting system for window blinds having a headrail supporting a plurality of slats depending therefrom, the lighting system comprising:

a plurality of removable light mount assemblies adapted to removably attach to the headrail, each light mount assembly having a support, a headrail clip attached to a first longitudinal end of the support and engaging the headrail, and a light clip attached to a second opposite longitudinal end of the support;

an extrusion having a generally inverted U-shape defining a channel therein, the extrusion engaged in the light clips and extending along and substantially parallel to the headrail;

a strip light retained in the channel; and a lens extending between ends of the legs of the inverted U-shaped extrusion.

14. The lighting system according to claim 13 wherein the headrail clip is shaped as an inverted U, each leg of the U-shape defining a recess wherein the recesses are adapted to engage oppositely extending flanges at the top of the headrail.

15. The lighting system according to claim 13 wherein the light clip is shaped as an inverted U, each leg of the U-shape forming inwardly facing ridges, the ridges engaging recesses defined by the outer surface of the extrusion.

16. The lighting system according to claim 13 wherein the strip light is a Light Emitting Diode strip light.

17. The lighting system according to claim 13 wherein the light mount assembly support includes a vertical leg at the second end thereof and further wherein a light clip is affixed to the vertical leg to horizontally orient the extrusion for directing the light strip toward the valance.

18. The lighting system according to claim 17 wherein:

the light mount assembly support includes a horizontal leg extending toward the valance at an end of the vertical leg, the horizontal leg having a second light clip affixed to a bottom surface thereof;

a second elongated U-shaped extrusion retained by the second light clips; and a second light strip retained in the second elongated extrusion.

19. The lighting system according to claim 17 wherein:

the light mount assembly support includes a horizontal leg extending toward the headrail at an end of the vertical leg, the horizontal leg having a second light clip affixed to a bottom surface thereof;

a second elongated U-shaped extrusion is retained by the second light clips; and a second light strip is retained in the second elongated extrusion.

20. The lighting system according to claim 13 further comprising a controller for mounting to the headrail and electrically connected to the light strip.

21. The lighting system according to claim 13 wherein the extrusion channel is oriented at 45 degrees to the horizontal.

* * * * *